US009021425B2

(12) United States Patent
Aly et al.

(10) Patent No.: US 9,021,425 B2
(45) Date of Patent: Apr. 28, 2015

(54) SOFTWARE APPLICATION EXTENSIBILITY (71) Applicants: Mohamed Abdulazim Aly, Darmstadt (DE); Anis Charfi, Darmstadt (DE); Andreas Roth, Walzbachtal (DE); Thomas Schneider, Heidelberg (DE)

(72) Inventors: Mohamed Abdulazim Aly, Darmstadt (DE); Anis Charfi, Darmstadt (DE); Andreas Roth, Walzbachtal (DE); Thomas Schneider, Heidelberg (DE)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 13/715,010

(22) Filed: Dec. 14, 2012

(65) Prior Publication Data
US 2014/0173448 A1 Jun. 19, 2014

(51) Int. Cl.
G06F 9/44 (2006.01)
(52) U.S. Cl.
CPC .... G06F 8/34 (2013.01); G06F 8/36 (2013.01)
(58) Field of Classification Search
None
See application file for complete search history.

(56) References Cited

U.S. PATENT DOCUMENTS

| | | | | |
|---|---|---|---|---|
| 6,601,234 | B1 * | 7/2003 | Bowman-Amuah | 717/108 |
| 7,219,327 | B1 * | 5/2007 | Jacobs et al. | 717/104 |
| 2002/0108099 | A1 * | 8/2002 | Paclat | 717/102 |
| 2005/0066317 | A1 * | 3/2005 | Alda et al. | 717/136 |
| 2005/0231762 | A1 * | 10/2005 | Nishikawa et al. | 358/1.15 |
| 2009/0248586 | A1 * | 10/2009 | Kaisermayr et al. | 705/80 |
| 2009/0249362 | A1 * | 10/2009 | Lindemann et al. | 719/316 |
| 2013/0031566 | A1 * | 1/2013 | Sureshan et al. | 719/313 |

OTHER PUBLICATIONS

Robert DeLine et al., "Easing Program Comprehension by Sharing Navigation Data," Proceedings of the 2005 IEEE Symposium on Visual Languages and Human-Centric Computing, VL/HCC'05, Sep. 2005, pp. 241-248.
Jeff Sutherland, "Business objects in corporate information systems," ACM Computing Surveys (CSUR), vol. 27, Issue 2, Jun. 1995, pp. 274-276.
Szyperski, C. (1997). Component Software: Beyond Object-Oriented Programming. Addison-Wesley.
Marcel Bruch et al., "Learning from Examples to Improve Code Completion Systems," Proceedings of the 7th Joint Meeting of the European Software Engineering Conference and the ACM SIGSOFT Symposium on the Foundations of Software Engineering, ESEC-FSE'09, Aug. 2009, pp. 213-222.
Keely L. Croxton et al., "The Supply Chain Management Processes," The International Journal of Logistics Management, vol. 12, No. 2, 2001, pp. 13-36.

(Continued)

Primary Examiner — Chameli Das
(74) Attorney, Agent, or Firm — Fish & Richardson P.C.

(57) ABSTRACT

Implementations of the present disclosure include methods, systems, and computer-readable storage mediums for supporting software application extensions including receiving, by the one or more processors, application information associated with a to-be-extended application, the application including a plurality of logical layers and including a computer-executable application that can be executed using one or more computing devices; processing, by the one or more processors, the application information; providing, based on the processing, graphical representations of one or more extensible artifacts associated with the application; displaying a first graphical representation within a browser interface, the first graphical representation being based on a first logical layer of the plurality of logical layers, the browser interface being provided as a computer-executable program that is executed using the one or more processors; and receiving user input provided using the browser interface, and in response to the user input, providing an extension of the application.

18 Claims, 8 Drawing Sheets

(56) References Cited

OTHER PUBLICATIONS

Uri Dekel et al., "Improving API Documentation Usability with Knowledge Pushing," Proceedings of the 31st International Conference on Software Engineering, ICSE 2009, May 2009, pp. 320-330.
Anja Guzzi et al., "Collective Code Bookmarks for Program Comprehension," Proceedings of the 19th International Conference on Program Comprehension, ICPC 2011, Jun. 2011, pp. 101-110.
Daqing Hou et al., "Obstacles in Using Frameworks and APIs: An Exploratory Study of Programmers' Newsgroup Discussions," Proceedings of the 19th International Conference on Program Comprehension, ICPC 2011, pp. 91-100.
Mozilla Corporation, 'Add-Ons for Firefox' [online], retrieved Dec. 10, 2012 from https://addons.mozilla.org/en-US/firefox/, 3 pages.
Christopher Oezbek et al., "JTourBus: Simplifying Program Understanding by Documentation that Provides Tours Through the Source Code," Proceedings of the IEEE International Conference on Software Maintenance, ICSM 2007, Oct. 2007, pp. 64-73.
David Rothlisberger et al., "SmartGroups: Focusing on Task-Relevant Source Artifacts in IDEs," Proceedings of the IEEE 19th International Conference on Program Comprehension, ICPC 2011, Jun. 2011, pp. 61-70.
SAP AG, 'SAP Business ByDesign' [online], retrieved on Dec. 10, 2012 from http://www.sap.com/solutions/technology/cloud/business-by-design/highlights/index.epx.
Janice Singer et al., "NavTracks: Supporting Navigation in Software Maintenance," Proceedings of the 21st IEEE International Conference on Software Maintenance, ICSM'05, Sep. 2005, pp. 325-334.
Jeffrey Stylos et al., "Mica: A Web-Search Tool for Finding API Components and Examples," Proceedings of the IEEE Symposium on Visual Languages and Human-Centric Computing, VL/HCC 2006, Sep. 2006, pp. 195-202.
Wil M.P. van der Aalst et al., "Business Process Management: A Survey," Proceedings of the Business Process Management, BPM 2003, Jun. 2003, Lecture Notes in Computer Science 2678, pp. 1-12.
Google Inc., 'Chrome web store—Extensions' [online], retrieved on Dec. 13, 2012, from https://chrome.google.com/webstore/category/extensions, 1 page.

\* cited by examiner

SOFTWARE APPLICATION EXTENSIBILITY

Extensibility is a topic of increasing importance in the software industry. In some examples, software applications are delivered by a software provider to support a certain domain through a set of predefined functionalities. Customers that acquire software applications may require additional functionalities that are not supported by the base software. In some examples, these additional functionalities may be realized through extensions. In some examples, extensions may be defined and/or developed by different roles. For example, extensions may be provided by the provider of the base software (the vendor), by the customer, and/or by a third party (e.g., an independent software vendor (ISV)). In some examples, to enable extensions, the provider of the base software defines extensibility concepts and mechanisms for the base software and provides supporting tools.

SUMMARY

Implementations of the present disclosure include computer-implemented methods for supporting software application extensions including the actions of receiving, by the one or more processors, application information associated with a to-be-extended application, the application including a plurality of logical layers and including a computer-executable application that can be executed using one or more computing devices; processing, by the one or more processors, the application information; providing, based on the processing, graphical representations of one or more extensible artifacts associated with the application; displaying a first graphical representation within a browser interface, the first graphical representation being based on a first logical layer of the plurality of logical layers, the browser interface being provided as a computer-executable program that is executed using the one or more processors; and receiving user input provided using the browser interface, and in response to the user input, providing an extension of the application.

These and other implementations may each optionally include one or more of the following features. For instance, the application information includes at least one of an extensibility model and one or more artifacts associated with the application. The application information is provided by a developer of the application. The plurality of logical layers includes two or more of a user interface layer, a process layer, an object layer and a database layer. Processing the user input in view of one or more constraints, the user input indicating the extension; and determining that the extension does not violate the one or more constraints, wherein providing the extension of the application occurs in response to determining that the extension does not violate the one or more constraints. Processing the application data includes analyzing one or more extensible artifacts and relationships between extensible artifacts. Receiving first user input, the first user input indicating user selection of a second logical layer of the plurality of logical layers; and in response to the first user input, displaying a second graphical representation within a browser interface, the first graphical representation being based on a second logical layer. Displaying one or more extensibility recommendations associated with an extensible artifact selected by a user. Displaying one or more extensibility recommendations associated an extensible artifact associated with a second logical layer of the plurality of logical layers. Receiving first user input, the first user input indicating a bookmark associated with an available extension of an extensible artifact; and providing a list of suggested development tasks based on the bookmark. The first graphical representation is representative of an extensible artifact in the first logical layer, and a plurality of suggested development tasks are displayed, the plurality of suggested development tasks including at least one of a suggested task to associate the extensible artifact with another artifact in the first logical layer and a suggested task to associate the extensible artifact with another artifact in a second logical layer. Receiving first user input, the first user input indicating an extension to be made to an extensible artifact; and in response to the first user input, displaying a set of development tasks that can be used to provide the extension. Determining that a development task of the one or more development tasks has been performed; and in response, providing an updated set of development tasks. The first graphical representation is representative of a user interface including one or more user interface elements. The first graphical representation including a marking associated with a user interface element, the marking indicating that the user interface element can be included to extend the user interface. The first graphical representation is representative of a business object. The first graphical representation is representative of a process.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to providing software application extensibility. In some examples, an application includes one or more logical layers. In some examples, the logical layers can be extended using extensible artifacts that are associated with each of the logical layers. The extensible artifacts provide the ability to include extra functionalities of the associated logical layer, and further, extra functionalities of the application. In some examples, the extensible artifacts can be graphically depicted in a graphical user interface (GUI) that is provided by a computer-executable editing tool. In some examples, when a particular layer and extensible artifact are selected for extension (e.g., by an extension developer), one or more recommendations for other related extensible artifacts of the same and/or other logical layers can be graphically depicted within the GUI and provided to the extension developer.

Figure 1:
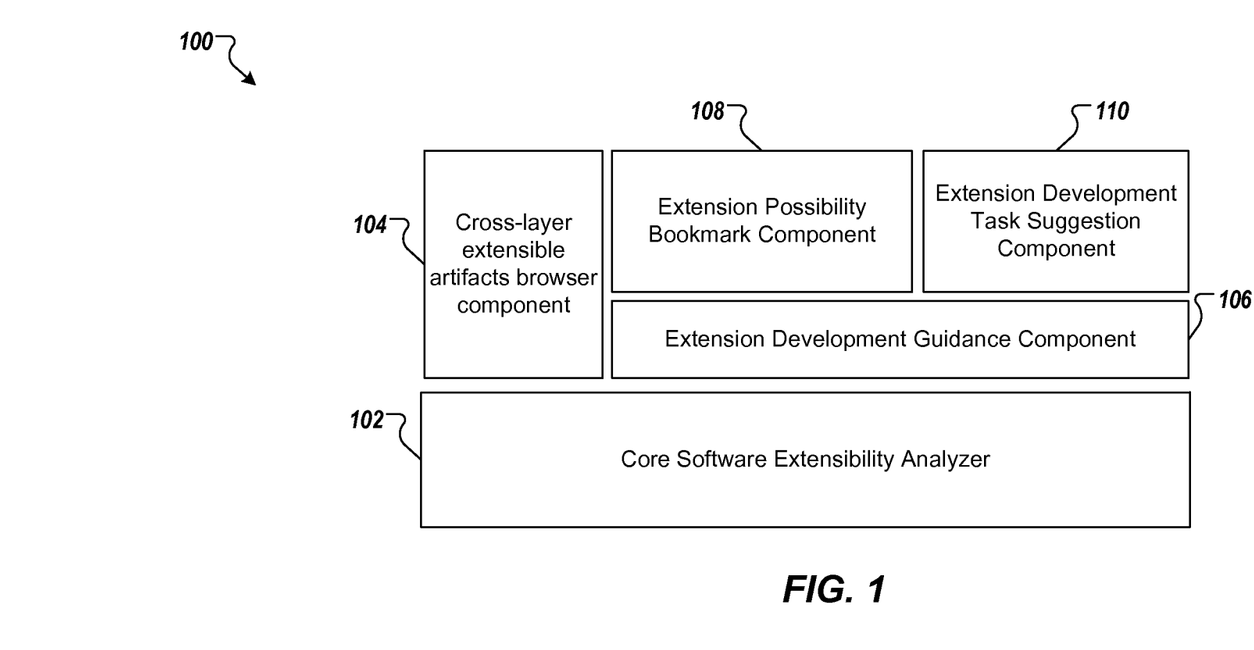
FIG. 1 depicts a system including example components in accordance with implementations of the present disclosure.

FIG. 1 depicts a system 100 including example components in accordance with implementations of the present disclosure. In some implementations, the system 100 provides extensibility possibilities of an application over one or more logical layers. Implementations of the present disclosure will be described in view of an example application. As discussed herein, the example application includes a business application that is used to support the execution of a set of business processes. However, implementations of the present disclosure are applicable to any appropriate application and are not limited to the example application discussed herein.

In the depicted example, the system 100 includes a core software extensibility model analyzer 102, a cross-layer extensible artifacts browser component 104, an extension development guidance component 106, an extension possibility bookmark component 108, and an extension development task suggestion component 110. In some examples, each component can be provided as one or more computer-executable programs executed using one or more computing devices.

In some implementations, the system 100 analyzes an underlying extensibility model (or extensible artifacts) of a business (software) application. In some examples, the underlying extensibility model can be predefined and provided by a software provider. In response to analyzing the underlying extensibility model, the system 100 provides a GUI that can display graphical representations of different extensible artifacts in the one or more logical layers (e.g., the business process layer, the user interface layer, the business object layer, the database layer, etc.). An extension developer can be provided the capability to browse through such extensible artifacts. Additionally, for example, in response to the extension developer selecting a particular extensible artifact for a particular logical layer, the system 100 can provide one or more recommendations for other related extensible artifacts within the same and/or other logical layers, and further provide relevant extension development tasks. The system 100 additionally provides bookmarking of extension possibilities (e.g., bookmarking of extensible artifacts of interest to the extension developer), provide one or more recommendations of development tasks, guide the extension developer in the development process, and provide that the development of the extensible artifacts is done without violating any constraints.

In some examples, the core software extensibility model analyzer 102, or analyzer 102, analyzes underlying extensible artifacts (e.g., artifacts provided by the underlying extensibility model), relationships between the underlying extensible artifacts within each of the logical layers, relationships between the logical layers, and relationships between the extensible artifacts of each of the logical layers, as defined by a software provider (e.g., a software provider of the underlying extensibility model). Based on, or in response to, the analysis of the underlying extensible artifacts, the analyzer 102 provides appropriate data to the cross-layer extensible artifacts browser component 104 and the extension development guidance component 106.

In some examples, the cross-layer extensible artifacts browser component 104, or browser component 104, provides the ability to browse through the related logical layers. For example, the browser component 104 provides, in response to a selection of a particular extensible artifact associated with a particular logical layer, the ability to browse through one or more differing logical layers and the extensible artifacts of the differing logical layers. Additionally, the browser component 104 analyzes extension possibilities for extensible artifacts within the layer of selection. For example, in response to the selection of a particular extensible artifact associated with a particular logical layer, the browser component 104 can provide one or more associated extensible artifacts of the particular layer. Moreover, the browser component 104 can provide one or more associated extensible artifacts of one or more differing logical layers. For example, in response to selection of a particular extensible artifact associated with a particular logical layer, the browser component 104 can provide one or more extensible artifacts of one or more differing logical layers.

In some examples, the extension development guidance component 106, or guidance component 106, maintains a listing (e.g., within a database) of the selection of the one or more extensible artifacts selected by the extension developer. The guidance component 106 additionally monitors the progress of the extension development (e.g., the selection of the one or more extensible artifacts) in view of any development constraints (e.g., as defined by the software provider and analyzed by the analyzer 102). The guidance component 106 interacts with the extension possibility bookmark component 108 by analyzing the selected one or more extension artifacts.

In some examples, the extension possibility bookmark component 108, or bookmark component 108, provides bookmarking of one or more extensible artifacts. For example, an extension developer can bookmark one or more of the extensible artifacts (e.g., through browsing of the extensible artifacts) that can be employed for a desired extension. In some examples, by utilizing the bookmark component 108 and bookmarking of the one or more extensible artifacts, the extension developer can be provided a list of suggested development tasks that can be suggested for development of an extension.

In some examples, the extension development task suggestion component 110, or suggestion component 110, provides one or more suggested development tasks (e.g., to the extension developer) based on the selected one or more extensible artifacts, a current state of the extension development, or both. Upon completion of one or more of development tasks (e.g., in response to a selection of the task by the extension developer), a new (updated) set of development tasks can be suggested by the suggestion component (e.g., based on the state of development of the extension).

Figure 2:
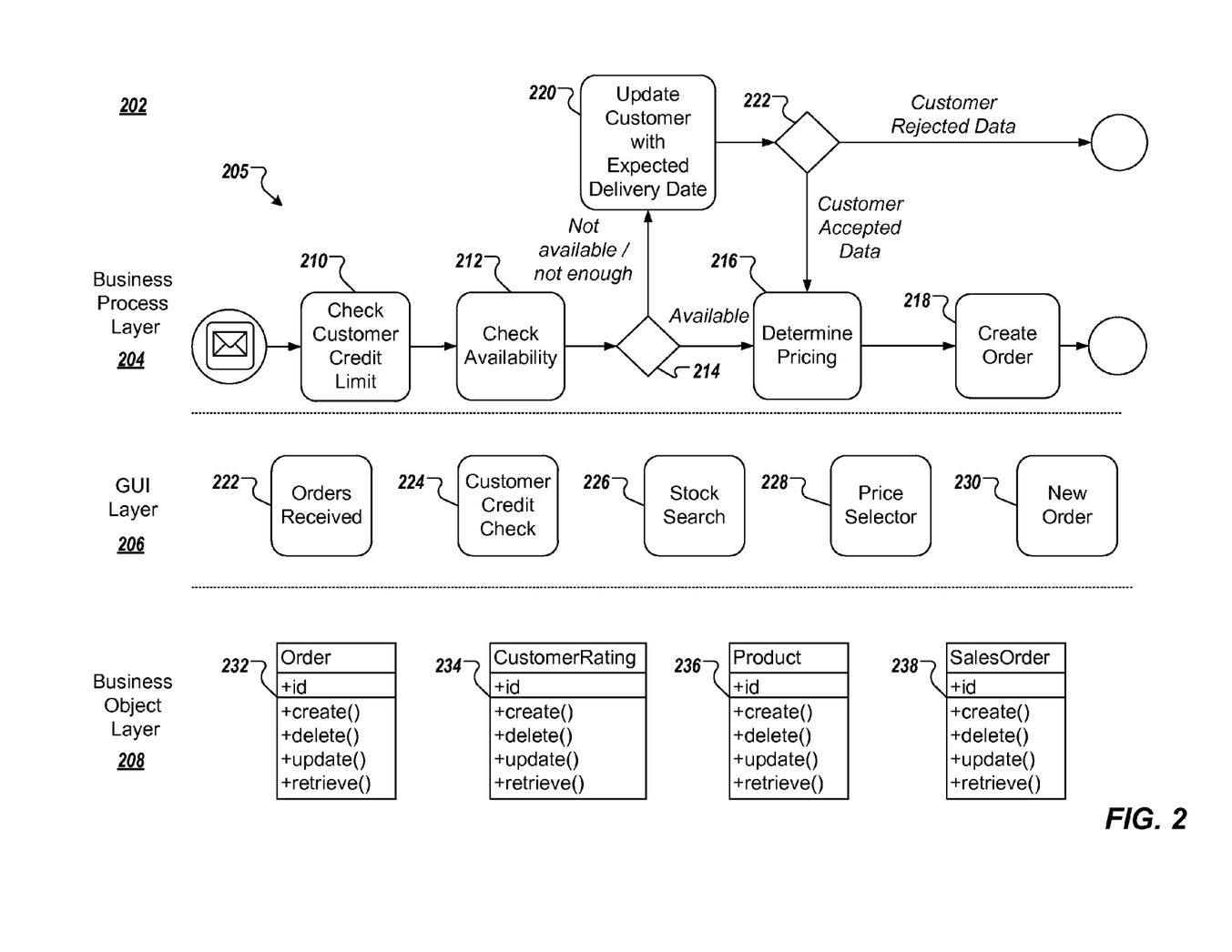
FIG. 2 depicts representations of example layers of an example application.

FIG. 2 depicts representations of example logical layers of an example application 202. In an example context, the application 202 can be provided as a business application. In the depicted example, the business application 202 supports execution of a set of business processes. In some examples, the business application 202 supports such business processes as sales order processing and human resources management process. In some examples, the business application includes a business process layer 204, a graphical user interface (GUI) layer 206, and a business object layer 208. Each of the layers 204, 206, and 208 can include one or more extensible artifacts. In some examples, the business application 202 can be provided in an electronic document that is computer-readable and can be stored in digital memory.

The business process layer 204 includes a business process 205 that can be realized by the business application 202. In some examples, the business process 205 is provided based on an underlying business process model (e.g., a business process model provided in business process modeling notation (BPMN)). For example, the business process layer 204 includes elements such as a "Check Customer Credit Limit" element and a "Create Order" element. In some examples, each element represents a task that can be performed in the business process 205. In some examples, the business process layer 204 can be associated with such extensible artifacts as activity extensible artifacts, task extensible artifacts, and event extensible artifacts.

The graphical user interface layer 206 includes one or more user interface elements, such as user interface elements that an end user interacts with. For example, the user interface layer 206 includes interface elements such as an "Orders Received" interface element and a "Price Selector" interface element. In some examples, the user interface layer 206 can be associated with such extensible artifacts as panel extensible artifacts, list extensible artifacts, and check box extensible artifacts.

The business object layer 208 includes data structures, data models, and business logic that facilitate execution of the business application 202. For example, the business object layer 208 includes objects such as a "CustomerRating" object and a "Product" object. In some examples, the business object layer 208 can be associated with such extensible artifacts as method extensible artifacts, business object action extensible artifacts, node extensible artifacts, attribute extensible artifacts, class extensible artifacts, and data structure extensible artifacts.

As discussed above, the business process layer 204 includes the business process 205. The example business process 205 includes a plurality of tasks. In some examples, the business process 205 monitors orders sent by customers. A task 210 includes checking a customer credit limit (e.g., in response to receiving an order). A task 212 includes internally checking an availability of the products ordered. A task 214 includes determining whether the products are available. If it is determined that the products are available, a task 216 includes determining the pricing of the products. A task 218 includes creating an order for the products. If it is determined that the products are not available (or not enough of the products are available), a task 220 includes updating the customer with an expected (forecasted) delivery date of his order. A task 222 includes determining whether the customer accepts the expected delivery date. If it is determined that the customer does not accept the expected delivery date, the expected delivery date is rejected. If it is determined that the customer accepts the expected delivery date, the business process proceeds to task 216.

In some examples, the user interface layer 206 provides one or more interfaces for interaction by the end user. The one or more interfaces can include such interfaces as an order received interface element 222, a customer credit check interface element 224, a stock search interface element 226, a price selector interface element 228, and a new order interface element 230. In some examples, the user interface layer 206 can include user interface elements such as buttons and panels.

In some examples, the business object layer 208 provides one or more functionalities to the business application 202, including access to an underlying database to create, retrieve, update, and delete records. For example, the order object 232 maintains (e.g., in a database) a listing of the items requested by customers. The customer rating object 234 maintains (e.g., in a database) the credit rating information for each customer. The product object 236 maintains (e.g., in a database) information of the products and the availability of the products in stock. The sales order object 238 includes the sales order information generated for each customer order. In some implementations, each business object 232-238 also contains business logic for execution of the business process and for the consistency of the data.

In some implementations, the functionality of the business application 202 can be extended (e.g., extending the functionality of the order processing business process). For example, the business application 202 can be extended to include additional functionality of checking a customer credit risk with an external credit reporting agency. In some examples, to extend such functionality to the business application 202, each of the layers 204-208 can be analyzed and extended, as appropriate (e.g., in view of any development constraints, such as dependencies between the logical layers).

For example, a business process element can be added to the business process layer 204 that can be associated with an external credit check of the users via the external credit report agency. In some examples, the external credit check can be performed after or in parallel with the internal check, and prior to the determining the product availability. With regard to the graphical user interface layer 206, the customer credit check user interface 224 can be updated with user interface elements that facilitate display of an indicator of the rating provided by the external credit reporting agency. With regard to the business object layer 208, an external customer rating object can be implemented to communicate with the external credit reporting agency, store queries, and associated business logic. In some examples, the customer rating object 234 can further be extended to include the external rating.

Figure 3:
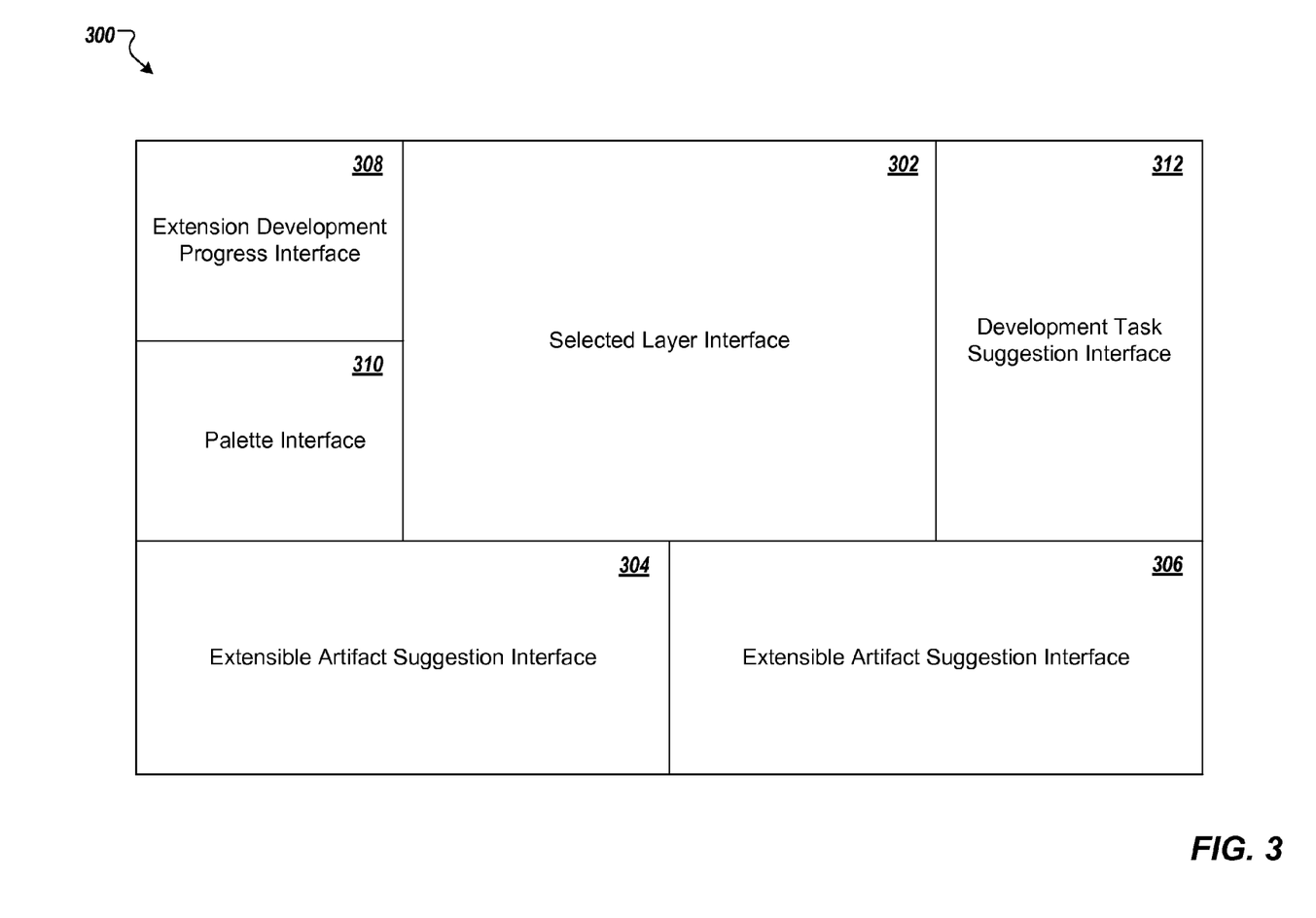
FIG. 3-6 depicts screenshots of an example tool in accordance with implementations of the present disclosure.

FIG. 3-6 depict screenshots of an example tool in accordance with implementations of the present disclosure. FIG. 3 depicts an example user interface 300 for providing business application extensibility. In some examples, the user interface 300 includes a selected layer interface 302, extensible artifact suggestion interfaces 304 and 306, an extension development progress interface 308, a palette interface 310, and a development task suggestion interface 312. The selected layer interface 302 displays one of the logical layers (e.g., the business process layer 204, the user interface layer 206, the business object layer 208) and associated information (e.g., elements, interface elements, objects). The extensible artifact suggestion interfaces 304 and 306 display extensible artifacts relating to the other (unselected) layer (or layers). The extension development progress interface 308 provides for display a listing of (previously) selected extensible artifacts. The palette interface 310 provides for display one or more extensible artifacts for inclusion by the selected logical layer (and dependent on the selected logical layer). The development task suggestion interface 312 provides for display one or more suggested development tasks. Additionally, based on the progress of the extension development and the artifact selection by the extension developer, the development task suggestions interface 312 can be updated accordingly.

In some implementations, the selected layer interface 302 and the extensible artifact suggestion interfaces 304 and 306 can be associated with the browser component 104; the extension development progress interface 308 can be associated with the guidance component 106; and the development task suggestion interface 312 can be associated with the suggestion component 110, described further below.

Figure 4:
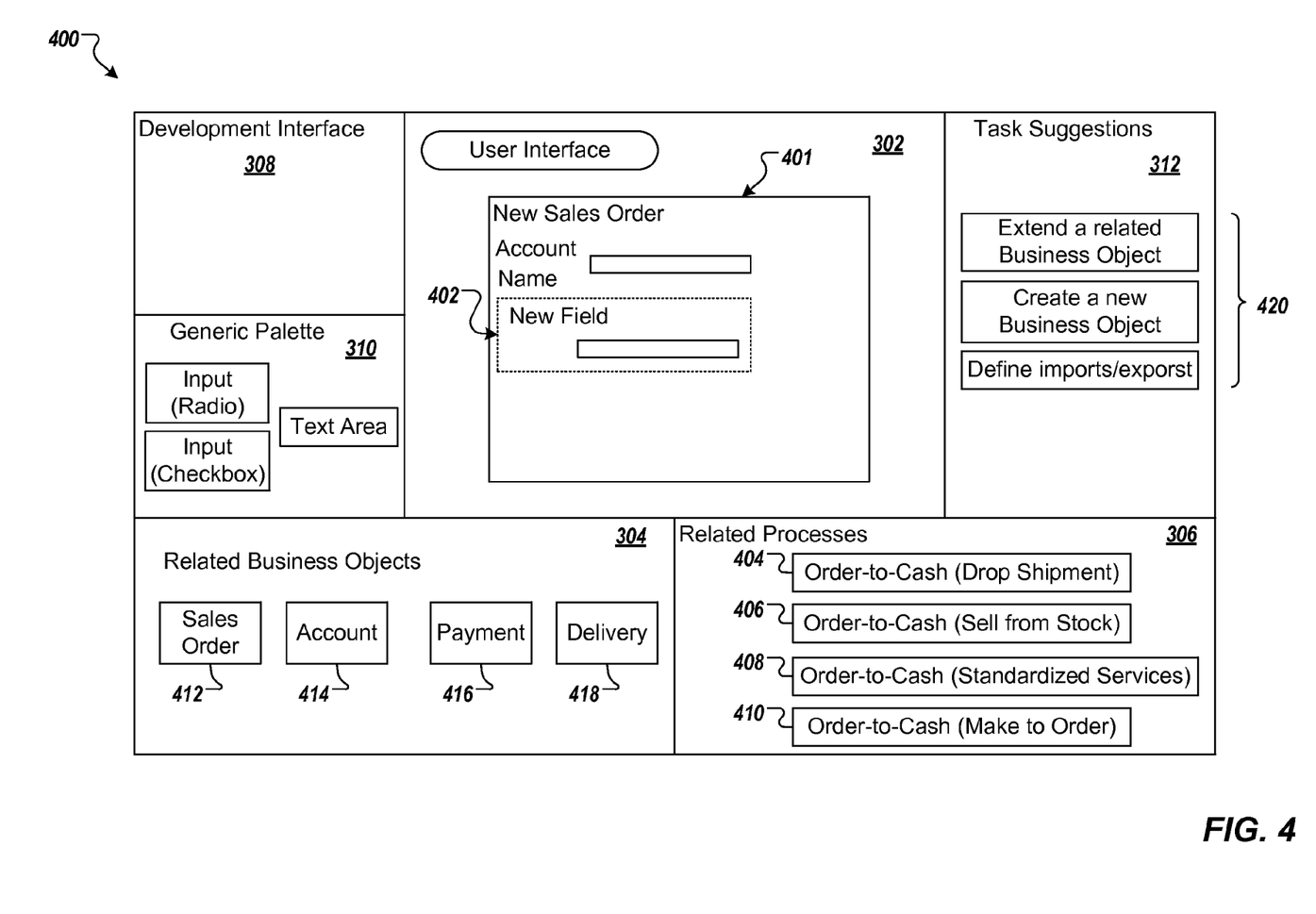

FIG. 4 illustrates an example user interface 400 based on the example user interface 300, for providing business application extensibility. For example, the user interface 400 includes the selected layer interface 302 displaying the user interface layer 206 as the selected layer (e.g., a graphical representation of the user interface layer 206). In some examples, the selected layer interface 302 illustrates a "New Sales Order" user interface 401 of the user interface layer 206.

In some examples, a region of the user interface layer 206 that is extensible (e.g., via extensible artifacts) can be indicated as an extensible region 402 of the selected layer interface 302. The browser component 104 provides for display the ability to browse through the user interface layer 206, and provide suggestions for extensible artifacts associated with the extensible region 402. For example, the "New Sales Order" user interface 401 of the user interface layer 206 includes a "New Field" extensible region 402. In some examples, the extensible region 402 can be highlighted (e.g., colored, bolded, etc.).

In some examples, possible extensible artifacts for inclusion by the extensible region 402 of the user interface layer 206 can be displayed by the palette interface 310. For example, as illustrated, the selected layer interface 302 includes the user interface layer 206. Thus, the extensible artifacts provided by the palette interface 310 include extensible artifacts related to the user interface layer 206. For example, the illustrated extensible artifacts include user interface elements such as radio buttons and checkboxes.

For example, the extensible region 402 can include extensible artifacts related to the additional functionality of checking a customer credit risk with an external credit reporting agency, as mentioned above. The extensible region 402 can include extensible artifacts relating to the display of an indicator of the rating provided by an external credit reporting agency (such as the radio buttons or checkboxes included by the palette interface 310).

In some examples, the extensible artifact suggestion interfaces 304 and 306 include extensible artifacts related to the business object layer 208 and the business process layer 204, respectively (e.g., graphical representations of the business object layer 208 and the business process layer 204) as a result of the selected layer interface 302 displaying the user interface layer 206. The browser component 104 provides for display the ability to browse through extensible artifacts of the business process layer 204 and the business object layer 208 (e.g., associated layers of the user interface layer 206) that are associated with a selected artifact of the user interface layer 206 (e.g., the extensible artifacts included by the extensible region 402). For example, the associated extensible artifacts associated with the business process layer 204 include extensible artifacts (e.g., elements) 404, 406, 408, and 410 and the associated extensible artifacts associated with the business object layer 208 include extensible artifacts (e.g., objects) 412, 414, 416, 418. In some examples, the analyzer 102 analyzes the underlying extensible model associated with the user interface layer 206, the business process layer 204, and the business object layer 208, and the associated extensible artifacts of each layer. In response to such analysis, the analyzer 102 provides the extensible artifacts 404-418 as suggested extensible artifacts within the extensible artifact suggestion interfaces 304 and 306. For example, the extensible artifact suggestion interface 304 includes the related artifacts of the business object layer 208 such as the sales orders element 412 and the delivery element 418; and the extensible artifact suggestion interface 206 includes the related artifacts of the business process layer 204 such as an "order-to-cash (drop shipment)" object 404.

In some examples, the development task suggestion interface 312 includes for display one or more tasks 420 associated with the selected logical layer (e.g., the user interface layer 206) as well as one or more tasks associated with the other logical layers associated with the selected logical layer (e.g., the business process layer 204 and the business object layer 208). In some examples, the suggestion component 110 provides the tasks 420 for display within the development task suggestion interface 312 based on the selected extensible region 402 (and selected extensible artifacts), the current state of the extension development, or both.

In some examples, by selecting a task 420 associated with a logical layer that is not the currently selected logical layer (e.g., a task associated with the business process layer 204 or the business object layer 208), the layer associated with the selected task 420 becomes the selected logical layer, and thus, the selected layer interface 302 includes the layer associated with the selected task 420.

Figure 5:
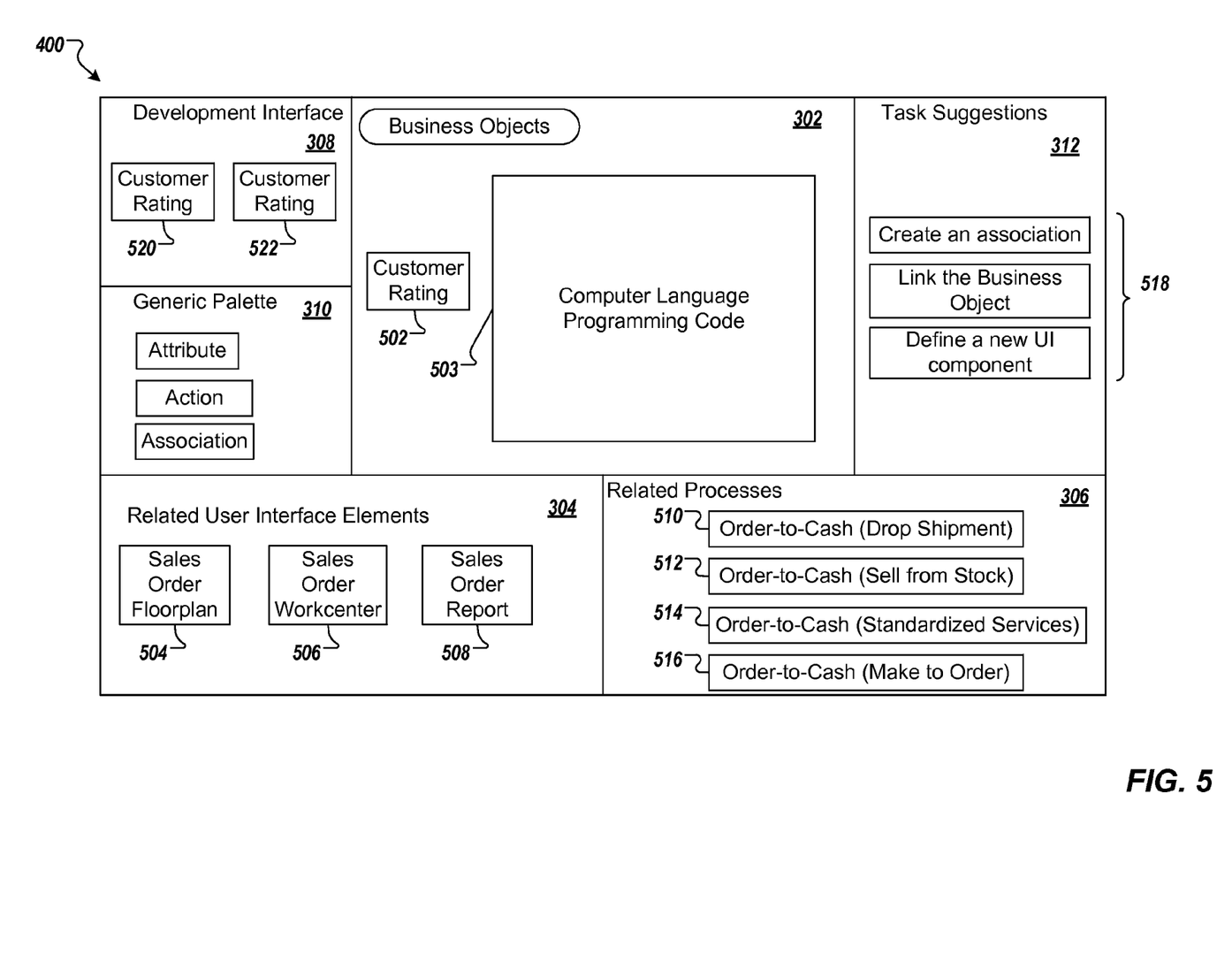

FIG. 5 illustrates the user interface 400 including the selected layer interface 302 displaying the business object layer 208 (e.g., a graphical representation of the business object layer 208). In some implementations, after selecting one or more extensible artifacts with respect to the user interface layer 204, as mentioned above with respect to the user interface 300 and FIG. 3, the user interface 400 of FIG. 5 can be provided such that corresponding extensible artifacts of the business object layer 208 can be selected (e.g., by the extension developer). For example, the selected layer interface 302 includes the business object layer 208 and a customer rating object 502 (of the business object layer 208). The selected layer interface 302 further illustrates a portion of a computer language programming code 503 associated with the customer rating object 502. In some examples, the customer rating object 502 can be an extensible object associated with the extensible region 402 of the user interface layer 204 (as shown in FIG. 4), and any extensible articles associated with the extensible region 402 of the user interface layer 204. In some examples, the browser component 104 provides for display the ability to browse through the business object layer 208, and particularly, provides suggestions for extensible artifacts of the business object layer 208 associated with the extensible region 402 of the user interface layer 204 (e.g., the customer rating object 502).

As discussed above with respect to FIG. 3, the palette interface 310 displays possible extensible artifacts for inclusion within the business object layer 208. For example, the palette interface 310 includes objects such as "Attribute" and "Action" objects.

For example, the extensible objects of the business object layer 208 can include extensible artifacts related to the additional functionality of checking a customer credit risk with an external credit reporting agency, as mentioned above. In some examples, the extensible artifacts of the business object layer 208 can include objects implemented to communicate with the external credit reporting agency, store queries, and associated business logic.

In some examples, the extensible artifact suggestion interfaces 304 and 306 include extensible artifacts related to the user interface layer 206 and the business process layer 204, respectively (e.g., graphical representations of the user interface layer 206 and the business process layer 204) as a result of the selected layer interface 302 displaying the business object layer 208. In some examples, the browser component 104 provides for display the ability to browse through extensible artifacts of the user interface layer 206 and the business object layer 204 associated with a selected artifact of the business object layer 208. In some examples, the selected artifact of the business object layer 208 can be associated with the selected artifact of the user interface layer 204, as mentioned above with respect to FIG. 3.

For example, the associated extensible artifacts associated with the user interface layer 206 include extensible artifacts (e.g., interface elements) 504, 506, and 508 and the associated extensible artifacts associated with the business process layer 204 include extensible artifacts (e.g., elements) 510, 512, 514, and 516. In some examples, the analyzer 102 analyzes the underlying extensible model associated with the user interface layer 206, the business process layer 204, and the business object layer 208, and the associated extensible artifacts of each layer. In response to such analysis, the analyzer 102 provides for display the extensible artifacts 504-516 as suggested extensible artifacts within the extensible artifact suggestion interfaces 304 and 306. For example, the extensible artifact suggestion interface 304 includes suggested extensible artifacts of the user interface layer 206 such as artifacts "Sales Order Floor plan" interface element 504 and "Sales Order Workcenter" interface element 506.

Additionally, as a result of the selected layer interface 302 displaying the business object layer 208, the development task suggestion interface 312 can be updated to include one or more tasks 518 associated with the business object layer 208. In some examples, the tasks 518 can also be associated with the other logical layers associated with the business object layer 208 (e.g., the business process layer 204 and the user interface layer 206).

In some examples, the development progress interface 308 includes for display a listing of the selected extensible artifacts. For example, as the extension developer progresses from having the selected layer interface 302 include the user interface layer 206 and the business object layer 208, the development progress interface 308 can include the selected extensible artifacts as related to the user interface layer 206 and the business object layer 208. For example, the development progress interface 208 can include a customer rating interface element 520 and a customer rating object 522.

Figure 6:
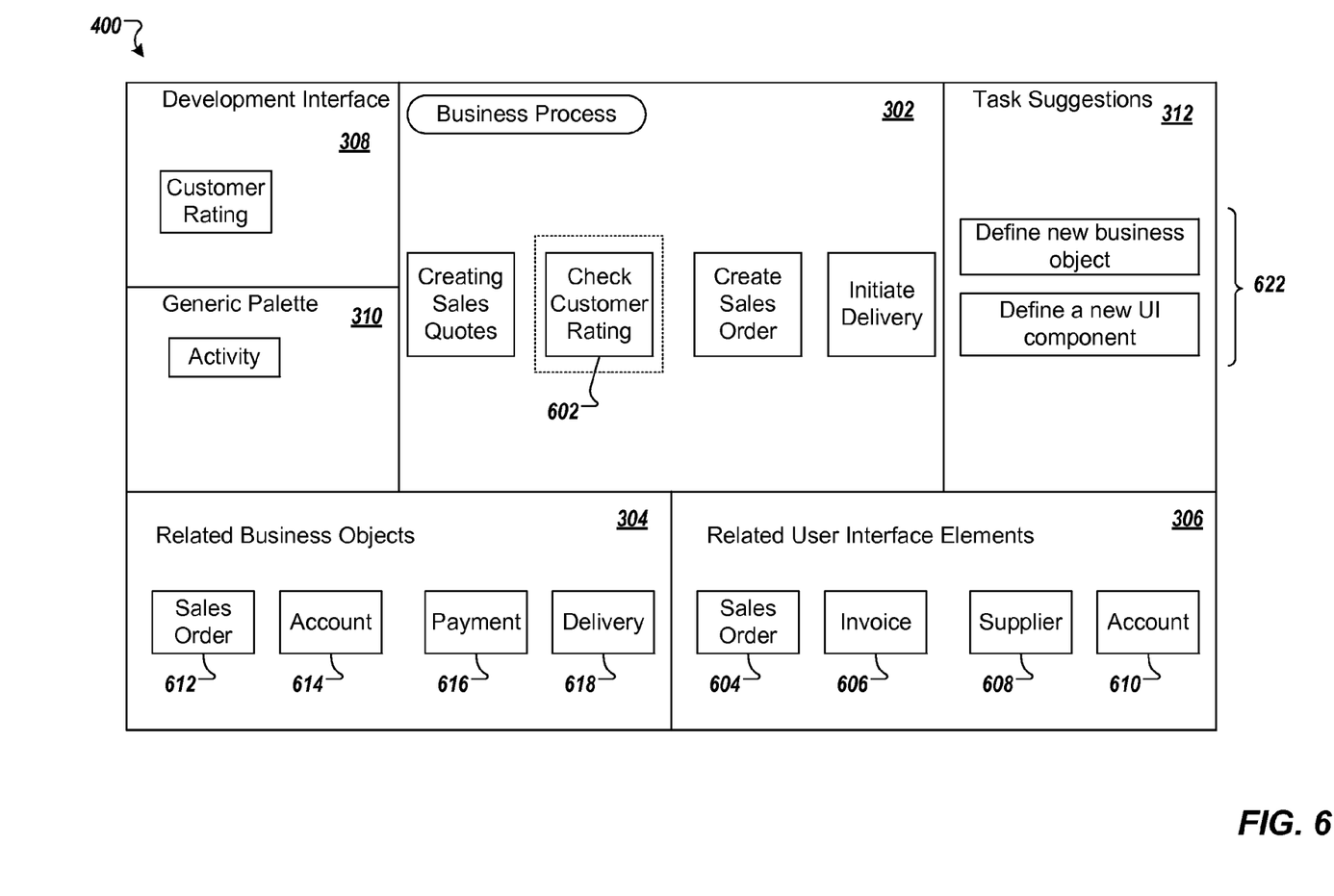

FIG. 6 depicts the user interface 400 including the selected layer interface 302 displaying the business process layer 204 (e.g., a graphical representation of the business process layer 204). In some implementations, after selecting one or more extensible artifacts with respect to the user interface layer 204, as mentioned above with respect to the user interface 300 and FIG. 3, the user interface 600 can be provided such that corresponding extensible artifacts of the business process layer 204 can be selected (e.g., by the extension developer). For example, the selected layer interface 302 includes the business process layer 204 and further illustrates a check customer rating element 602 and other elements (e.g., "Creating Sales Quotes" and "Creating Sales Orders" elements) according to the underlying business extensible model associated with the business application 200. In some examples, the check customer rating element 602 can be an extensible element associated with the extensible region 402 of the user interface layer 204, and any extensible articles associated with the extensible region 402 of the user interface layer 204. In some examples, the check customer rating element 602 can be an extensible object associated with the customer rating object 502 of the business object layer 208. In some examples, the browser component 104 provides for display the ability to browse through the business process layer 204, and particularly, provides suggestions for extensible artifacts of the business process layer 204 associated with the extensible region 402 of the user interface layer 204 (e.g., the extensible region 402), the extensible artifacts of the business object layer 206 (e.g., the customer rating object 502), or both.

As discussed above with respect to FIG. 3, in some examples, the palette interface 310 includes possible extensible artifacts for inclusion within the business process layer 204. For example, the palette interface 310 includes elements such as an "Activity" element.

For example, the extensible objects of the business process layer 204 can include extensible artifacts related to the additional functionality of checking a customer credit risk with an external credit reporting agency, as mentioned above. In some examples, the extensible artifacts of the business process layer 204 can include elements associated with an external credit check of the users via the external credit report agency.

In some examples, the extensible artifact suggestion interfaces 304 and 306 include extensible artifacts related to the business process layer 204 and the user interface layer 206, respectively (e.g., graphical representations of the business process layer 204 and the user interface layer 208) as a result of the selected layer interface 302 displaying the business process layer 204. In some examples, the browser component 104 provides for display the ability to browse through extensible artifacts of the user interface layer 206 and the business object layer 208 associated with a selected artifact of the business process layer 204. In some examples, the selected artifact of the business process layer 204 can be associated with the selected artifact of the user interface layer 204, as mentioned above with respect to FIG. 3.

For example, the associated extensible artifacts associated with the user interface layer 206 include extensible artifacts (e.g., interface elements) 604, 606, 608, and 610 and the associated extensible artifacts associated with the business object layer 208 include extensible artifacts (e.g., objects) 612, 614, 616, and 618. In some examples, the analyzer 102 analyzes the underlying extensible model associated with the user interface layer 206, the business process layer 204, and the business object layer 208, and the associated extensible artifacts of each layer. In response to such analysis, the analyzer 102 provides for display the extensible artifacts 604-618 as suggested extensible artifacts within the extensible artifact suggestion interfaces 304 and 306. For example, the extensible artifact suggestion interface 304 includes the suggested extensible artifacts of the business object layer 208 such as "Sales Order" object 612 and "Account" object 614 and the extensible artifact suggestion interface 306 includes the suggested extensible artifacts of the user interface layer 206 such as artifacts "Sales Order" interface element 604 and "Invoice" interface element 606.

Additionally, as a result of the selected layer interface 302 displaying the business process layer 204, the development task suggestion interface 312 can be updated to include one or more tasks 622 associated with the business process layer 204. In some examples, the tasks 622 can also be associated with the other logical layers associated with the business process layer 204 (e.g., the business object layer 208 and the user interface layer 206).

Figure 7:
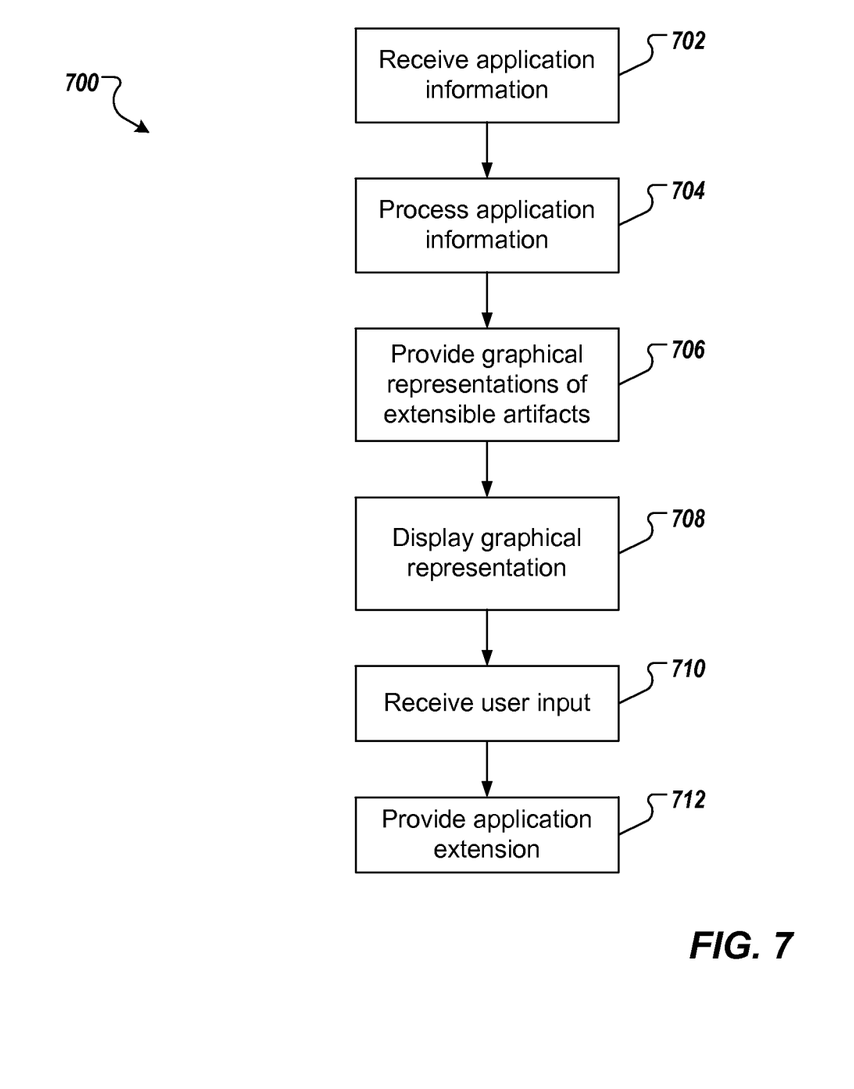
FIG. 7 is a flowchart depicting an example process that can be executed in accordance with implementations of the present disclosure.

FIG. 7 is a flowchart of an example process for providing business application extensibility of a business application. The example process 700 can be executed using one or more computing devices. For example, the system 100 can execute the example process 700.

Application information associated with a to-be-extended application is received (702). In some examples, the application information is provided by a developer of the application. In some examples, the application information includes an extensibility model and/or one or more extensible artifacts. In some examples, the application includes a plurality of logical layers. In some examples, the plurality of logical layers includes a user interface layer, a process layer, a data object layer and a database layer. The application information is processed (704). In some examples, the analyzer 102 of FIG. 1 processes the application data, as discussed herein.

Graphical representations of one or more extensible artifacts associated with the application are provided (706). A graphical representation is displayed within a browser interface (708). In some examples, the graphical representation is based on a logical layer of the plurality of logical layers. User input provided using the browser interface is received (710). In response to the user input, an extension of the application is provided (712).

Figure 8:
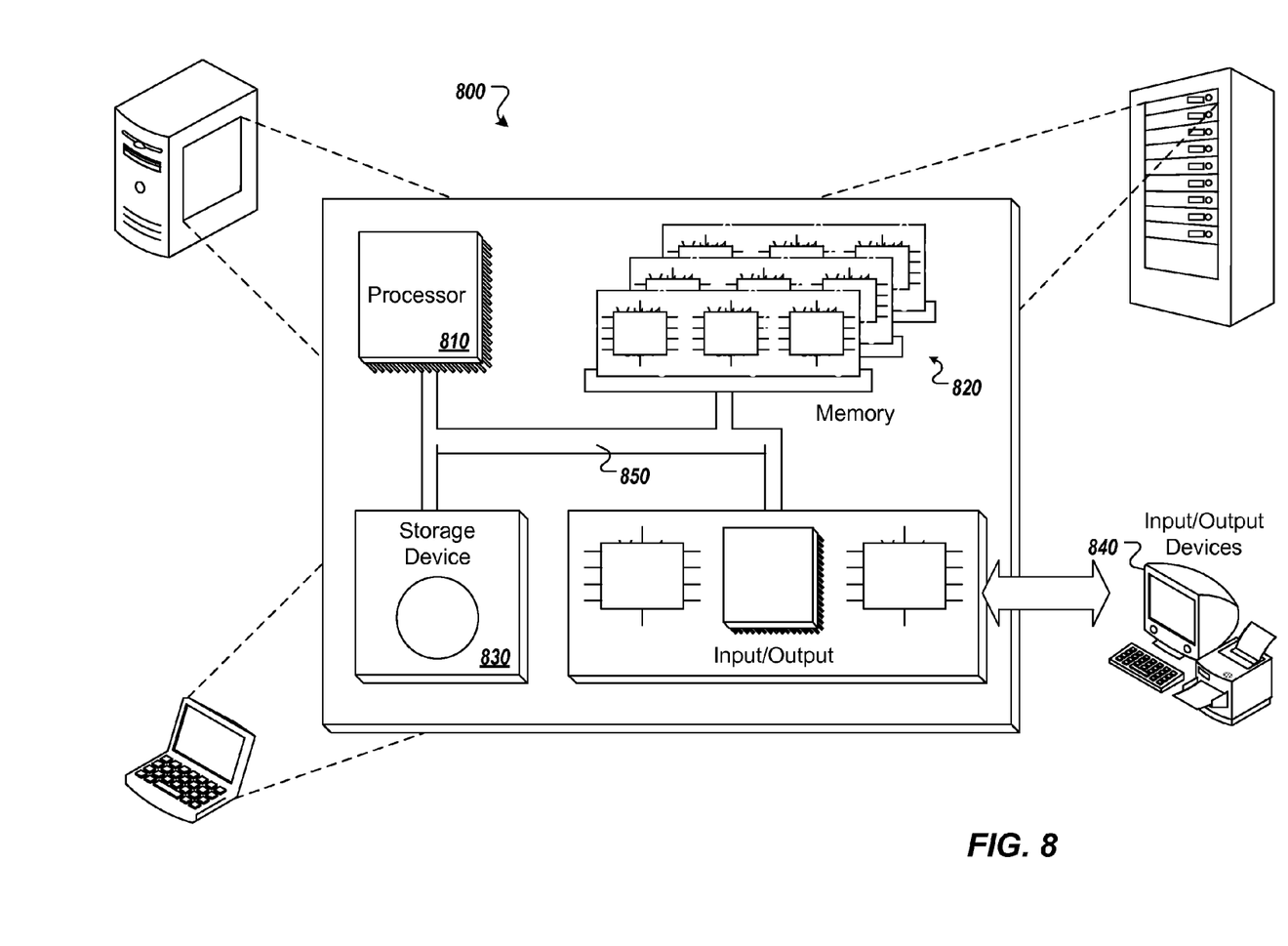
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 880 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. A computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for supporting software application extensions, the method being executed using one or more processors and comprising:
   receiving, by the one or more processors, application information associated with a to-be-extended application, the application comprising a plurality of logical layers and comprising a computer-executable application that can be executed using one or more computing devices;
processing, by the one or more processors, the application information;
providing, based on the processing, a plurality of graphical representations of one or more extensible artifacts associated with the application;
displaying a first graphical representation of the plurality of graphical representations and a plurality of suggested development tasks within a browser interface provided as a computer-executable program that is executed using the one or more processors, the first graphical representation being based on a first logical layer of the plurality of logical layers and being representative of an extensible artifact in the first logical layer, and the plurality of suggested development tasks comprising at least one of a first suggested task to associate the extensible artifact with a first artifact in the first logical layer and a second suggested task to associate the extensible artifact with a second artifact in a second logical layer; and
receiving user input provided using the browser interface, and in response to the user input, providing an extension of the application.

2. The method of claim 1, wherein the application information comprises at least one of an extensibility model and one or more artifacts associated with the application.

3. The method of claim 1, wherein the application information is provided by a developer of the application.

4. The method of claim 1, wherein the plurality of logical layers comprises two or more of a user interface layer, a process layer, an object layer and a database layer.

5. The method of claim 1, further comprising:
processing the user input in view of one or more constraints, the user input indicating the extension; and
determining that the extension does not violate the one or more constraints, wherein providing the extension of the application occurs in response to determining that the extension does not violate the one or more constraints.

6. The method of claim 1, wherein processing the application data comprises analyzing one or more extensible artifacts and relationships between extensible artifacts.

7. The method of claim 1, further comprising:
receiving first user input, the first user input indicating user selection of a second logical layer of the plurality of logical layers; and
in response to the first user input, displaying a second graphical representation within a browser interface, the second graphical representation being based on a second logical layer.

8. The method of claim 1, further comprising displaying one or more extensibility recommendations associated with an extensible artifact selected by a user.

9. The method of claim 1, further comprising displaying one or more extensibility recommendations associated an extensible artifact associated with a second logical layer of the plurality of logical layers.

10. The method of claim 1, further comprising:
receiving first user input, the first user input indicating a bookmark associated with an available extension of an extensible artifact; and
providing a list of suggested development tasks based on the bookmark.

11. The method of claim 1, further comprising:
receiving first user input, the first user input indicating an extension to be made to an extensible artifact; and
in response to the first user input, displaying a set of development tasks that can be used to provide the extension.

12. The method of claim 11, further comprising:
determining that a development task of the one or more development tasks has been performed; and
in response, providing an updated set of development tasks.

13. The method of claim 1, wherein the first graphical representation is representative of a user interface comprising one or more user interface elements.

14. The method of claim 13, wherein the first graphical representation comprises a marking associated with a user interface element, the marking indicating that the user interface element can be included to extend the user interface.

15. The method of claim 1, wherein the first graphical representation is representative of a business object.

16. The method of claim 1, wherein the first graphical representation is representative of a process.

17. A non-transitory computer-readable storage medium coupled to one or more processors and having instructions stored thereon which, when executed by the one or more processors, cause the one or more processors to perform operations for supporting software application extensions, the operations comprising:
receiving, by the one or more processors, application information associated with a to-be-extended application, the application comprising a plurality of logical layers and comprising a computer-executable application that can be executed using one or more computing devices;
processing, by the one or more processors, the application information;
providing, based on the processing, a plurality of graphical representations of one or more extensible artifacts associated with the application;
displaying a first graphical representation of the plurality of graphical representations and a plurality of suggested development tasks within a browser interface provided as a computer-executable program that is executed using the one or more processors, the first graphical representation being based on a first logical layer of the plurality of logical layers and being representative of an extensible artifact in the first logical layer, and the plurality of suggested development tasks comprising at least one of a first suggested task to associate the extensible artifact with a first artifact in the first logical layer and a second suggested task to associate the extensible artifact with a second artifact in a second logical layer; and
receiving user input provided using the browser interface, and in response to the user input, providing an extension of the application.

18. A system, comprising:
a computing device; and
a computer-readable storage device coupled to the computing device and having instructions stored thereon which, when executed by the computing device, cause the computing device to perform operations for supporting software application extensions, the operations comprising:
receiving application information associated with a to-be-extended application, the application comprising a plurality of logical layers and comprising a computer-executable application that can be executed using one or more computing devices;
processing the application information;
providing, based on the processing, a plurality of graphical representations of one or more extensible artifacts associated with the application;
displaying a first graphical representation of the plurality of graphical representations and a plurality of suggested development tasks within a browser interface provided as a computer-executable program that is executed using the computing device, the first graphical representation being based on a first logical layer of the plurality of logical layers and being representative of an extensible artifact in the first logical layer and the plurality of suggested development tasks comprising at least one of a first suggested task to associate the extensible artifact with a first artifact in the first logical layer and a second suggested task to associate the extensible artifact with a second artifact in a second logical layer; and receiving user input provided using the browser interface, and in response to the user input, providing an extension of the application.

* * * * *